United States Patent Office 3,562,297
Patented Feb. 9, 1971

3,562,297
ALKANOLAMINE DERIVATIVES
Ralph Howe and Leslie Harold Smith, Macclesfield, England, assignors to Imperial Chemical Industries Limited, London, England, a corporation of Great Britain
No Drawing. Filed Oct. 16, 1967, Ser. No. 675,295
Claims priority, application England, Nov. 3, 1966, 49,368/66
Int. Cl. C07c *103/30*
U.S. Cl. 260—347.3     5 Claims

ABSTRACT OF THE DISCLOSURE

The disclosure relates to 1-acylaminophenoxy-3-amino-2-propanol derivatives, processes for their manufacture and pharmaceutical compositions containing them. The said compounds possess β-adrenergic blocking activity and are useful in the treatment of heart diseases. Representative of the compounds disclosed is 1-(4-propionamidophenoxy)-3-isopropylamino-2-propanol.

---

This invention relates to new alkanolamine derivatives which possess β-adrenergic blocking activity and which are therefore useful in the treatment or prophylaxis of heart diseases, for example angina pectoris and cardiac arrhythmias, and in the treatment of hypertension and phaeochromocytoma, in man.

According to the invention we provide new alkanolamine derivatives of the formula:

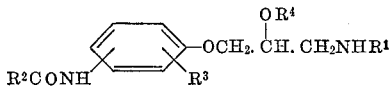

wherein either (a) $R^1$ stands for an alkyl radical which may optionally be substituted by one or more radicals selected from hydroxy and aryl radicals, which aryl radicals may themselves optionally be further substituted by one or more halogen atoms or alkyl or alkoxy radicals, or $R^1$ stands for a cycloalkyl or alkenyl radical, $R^2$ stands for hydrogen or for a hydroxyalkyl, aryloxyalkyl, halogenoalkyl, cycloalkyl, heterocyclyl or acylaminophenyl radical, or for the ethyl, vinyl, p-tolyl or m-nitrophenyl radical, $R^3$ stands for hydrogen or for an alkyl radical and $R^4$ stands for hydrogen or for an acyl radical; or (b) $R^1$ stands for the methyl or cyclopropyl radical, $R^2$ stands for hydrogen or for an alkyl, alkenyl, aryl, aralkyl or alkoxy radical, $R^3$ stands for hydrogen or for an alkyl radical and $R^4$ stands for hydrogen or for an acyl radical; or (c) $R^1$ stands for the isopropyl radical, $R^2$ stands for the methyl radical, $R^4$ stands for hydrogen or for an acyl radical and either $R^3$ stands for hydrogen and the group $R^2$CONH— is in the 2-position relative to the alkanolamine side-chain, or $R^3$ stands for the methyl radical in the 5-position relative to the alkanolamine side-chain and the group $R^2$CONH— is in the 3-position relative to the alkanolamine side-chain, or $R^3$ stands for the methyl radical in the 3-position relative to the alkanolamine side-chain and the group $R^2$CONH— is in the 4-position relative to the alkanolamine side-chain, or $R^3$ stands for the n-butyl radical in the 2-position relative to the alkanolamine side-chain and the group $R^2$CONH— is in the 5-position relative to the alkanolamine side-chain; or (d) $R^1$ stands for the isopropyl radical, $R^2$ stands for the methyl radical, $R^3$ stands for hydrogen and $R^4$ stands for the acetyl radical; and the acid-addition salts thereof.

It is to be understood that the above definition of alkanolamine derivatives encompasses all possible stereoisomers thereof, and mixtures thereof.

As a suitable value for $R^1$ when it stands for an alkyl radical, optionally substituted, there may be mentioned, for example, an alkyl radical of not more than 12 carbon atoms and particularly of 3, 4 or 5 carbon atoms, which preferably is branched at the α-carbon atom, for example the isopropyl, s-butyl or t-butyl radical, which alkyl radical may optionally be substituted by one or two radicals selected from hydroxy radicals and phenyl radicals which may themselves optionally be substituted by one or more chlorine or bromine atoms or methyl, ethyl, methoxy or ethoxy radicals. Thus, a specific value for $R^1$ when it stands for an alkyl radical, optionally substituted, is the isopropyl, s-butyl, t-butyl, 2-hydroxy-1,1-dimethylethyl, 1-methyl-3-phenylpropyl, 2-(4-methoxyphenyl)-1-methylethyl or 3-(4-chlorophenyl)-1,1-dimethylpropyl radical.

As a suitable value for $R^1$ or $R^2$ when it stands for a cycloalkyl radical there may be mentioned, for example, a cycloalkyl radical of not more than 8 carbon atoms, for example the cyclopropyl, cyclobutyl, cyclopentyl or cyclohexyl radial.

As a suitable value for $R^1$ when it stands for an alkenyl radical there may be mentioned, for example, an alkenyl radical of not more than 6 carbon atoms, for example the allyl radical.

As a suitable value for $R^2$ when it stands for a hydroxyalkyl, aryloxyalkyl or halogenoalkyl radical there may be mentioned, for example, an alkyl radical of not more than 6 carbon atoms which is substituted by a hydroxy or phenoxy radical or by a chlorine or bromine atom, or by one or more fluorine atoms, for example the hydroxymethyl, phenoxymethyl, chloromethyl or trifluoromethyl radical.

As a suitable value for $R^2$ when it stands for a heterocyclyl radical there may be mentioned, for example, a heterocyclyl radical of 5 or 6 ring atoms one or two of which are selected from nitrogen, oxygen and sulphur atoms. A specific value for $R^2$ when it stands for a heterocyclyl radical is, for example, the furyl, thienyl or pyridyl radical.

As a suitable value for $R^2$ when it stands for an acylaminophenyl radical there may be mentioned, for example, a phenyl radical substituted by an alkanoylamino or alkanesulphonylamino radical each of not more than 6 carbon atoms or an aroylamino or arenesulphonylamino radical each of not more than 10 carbon atoms, for example an acetamidophenyl, methanesulphonamidophenyl, benzamidophenyl or toluene-p-sulphonamidophenyl radical.

As a suitable value for $R^2$ when it stands for an alkyl, alkenyl or alkoxy radical there may be mentioned, for example, an alkyl, alkenyl or alkoxy radical each of not more than 6 carbon atoms, for example the methyl, ethyl, vinyl, methoxy or ethoxy radical.

As a suitable value for $R^2$ when it stands for an aryl or aralkyl radical there may be mentioned, for example, an aryl or aralkyl radical of not more than 10 carbon atoms, for example the phenyl, p-tolyl, p-chlorophenyl or benzyl radical.

As a suitable value for $R^3$ when it stands for a alkyl radical there may be mentioned, for example, an alkyl radical of not more than 6 carbon atoms, for example the methyl or ethyl radical.

As a suitable value for $R^4$ when it stands for an acyl radical there may be mentioned, for example, an alkanoyl or alkenoyl radical of not more than 20 carbon atoms, for example the acetyl, palmityl, stearyl or oleyl radical, or an aroyl radical of not more than 10 carbon atoms, for example the benzoyl radical.

As suitable acid-addition salts of the alkanolamine derivatives of the invention there may be mentioned, for example, salts derived from inorganic acids, for example hydrochlorides, hydrobromides, phosphates or sulphates, or salts derived from organic acids, for example oxalates, lactates, tartrates, acetates, salicylates, citrates, benzoates, β-naphthoates, adipates or 1,1-methylene-bis-(2-hydroxy-3-naphthoates), or salts derived from acidic synthetic resins, for example sulphonated polystyrene resins, for example "Zeo-Karb" 225 ("Zeo-Karb" is a trademark).

Specific new alkanolamine derivatives of the invention are, for example,
1-(4-propionamidophenoxy)-3-isopropylamino-2-propanol;
1-(5-acetamido-2-n-butylphenoxy)-3-isopropylamino-2-propanol;
1-(4-acetamido-3-methylphenoxy)-3-isopropylamino-2-propanol;
1-(4-formamidophenoxy)-3-isopropylamino-2-propanol;
1-(4-phenoxyacetamidophenoxy)-3-isopropylamino-2-propanol;
1-(4-acetamidophenoxymethyl)-2-isopropylaminoethyl acetate;
1-(2-acetamidophenoxy)-3-isopropylamino-2-propanol;
1-(4-chloroacetamidophenoxy)-3-isopropylamino-2-propanol;
1-(4-cyclohexanecarbonamidophenoxy)-3-isopropylamino-2-propanol;
1-(4-hydroxyacetamidophenoxy)-3-isopropylamino-2-propanol;
1-[4-(2-furamido)phenoxy]-3-isopropylamino-2-propanol;
1-(4-cyclopropanecarbonamidophenoxy)-3-isopropylamino-2-propanol;
1-[4-(p-acetamidobenzamido)phenoxy]-3-isopropylamino-2-propanol;
1-(4-m-nitrobenzamidophenoxy)-3-isopropylamino-2-propanol;
1-(4-p-toluamidophenoxy)-3-isopropylamino-2-propanol;
1-(4-acrylamidophenoxy)-3-isopropylamino-2-propanol;
1-(4-acetamidophenoxy)-3-cyclopropylamino-2-propanol;
1-(4-acetamidophenoxy)-3-methylamino-2-propanol;
1-(3-acetamido-5-methylphenoxy)-3-isopropyamino-2-propanol; and
1-(4-propionamidophenoxy)-3-t-butylamino-2-propanol;
and the acid-addition salts thereof.

According to a further feature of the invention we provide a process for the manufacture of those of the alkanolamine derivatives of the invention wherein $R^4$ stands for hydrogen, and the acid-addition salts thereof, which comprises the interaction of a compound of the formula:

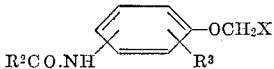

wherein $R^2$ and $R^3$ have the meanings stated above and wherein X stands for the group

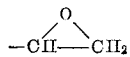

or the group —CHOH.CH$_2$Y, wherein Y stands for a halogen atom, or of mixtures of such components wherein X has both meanings stated above, with an amine of the formula NH$_2$R$^1$, wherein R$^1$ has the meaning stated above, whereafter, if desired, the product in free base form is reacted with an acid in order to form an acid-addition salt.

As a suitable value for Y there may be mentioned, for example, a chlorine or bromine atom. The interaction may be carried out at ambient temperature or it may be accelerated or completed by the application of heat, for example by heating to a temperature of 90–110° C.; it may be carried out at atmospheric or at an elevated pressure, for example by heating in a sealed vessel; and it may be carried out in an inert diluent or solvent, for example methanol or ethanol, or an excess of the amine of the formula NH$_2$R$^1$, wherein R$^1$ has the meaning stated above, may be used as diluent or solvent.

The starting material used in the above process may be obtained by the interaction of the corresponding phenol with an epihalohydrin, for example epichlorohydrin. The said starting material may be isolated or it may be prepared and used in situ without isolation.

According to a further feature of the invention we provide a process for the manufacture of those of the alkanolamine derivatives of the invention wherein $R^4$ stands for hydrogen, and the acid-addition salts thereof, which comprises the interaction of a compound of the formula:

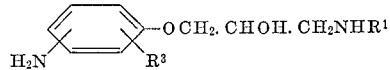

wherein $R^1$ and $R^3$ have the meanings stated above, with an acylating agent derived from an acid of the formula $R^2$COOH, wherein $R^2$ has the meaning stated above, under such conditions that neither the amino nor the hydroxy radical of the alkanolamine side-chain is acylated, whereafter, if desired, the product in free base form is reacted with an acid in order to form an acid-addition salt.

Suitable conditions are provided, for example, by the use of an acyl halide, for example an acyl chloride, or acid anhydride in aqueous conditions, for example in water or aqueous acetone, at a pH of between 3 and 7, preferably between 4 and 5, and at ambient temperature. A suitable acylating agent is, for example, acetic anhydride or propionic anhydride.

Alternatively, the acylation may be carried out by means of the acid of the formula $R^2$COOH itself in an inert diluent or solvent, for example ethyl acetate, and in the presence of a condensing agent, for example a carbodiimide. The reaction may be carried out at ambient temperature or, preferably, at a reduced temperature, for example at 0–5° C.

According to a further feature of the invention we provide a process for the manufacture of those of the alkanolamine derivatives of the invention wherein $R^1$ does not stand for a hydrogenolysable aralkyl group and wherein $R^4$ stands for hydrogen, and the acid-addition salts thereof, which comprises the hydrogenolysis of a compound of the formula:

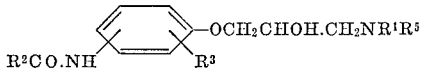

wherein $R^1$, $R^2$ and $R^3$ have the meanings stated above and wherein $R^5$ stands for a hydrogenolysable radical, or an acid-addition salt thereof, whereafter, if desired, the product in free base form is reacted with an acid in order to form an acid-addition salt.

As a suitable value for $R^5$ there may be mentioned, for example, the benzyl radical. The hydrogenolysis may be effected, for example, by catalytic hydrogenation, for example by hydrogenation in the presence of a palladium-on-charcoal catalyst, in an inert diluent or solvent, for example ethanol or aqueous ethanol, at ambient temperature and at atmospheric pressure or at an elevated pressure, for example at a pressure of 100 atmospheres. The process may be accelerated or completed by the presence of an acidic catalyst, for example hydrochloric or oxalic acid.

The starting materials used in the last-mentioned process may be obtained by the acylation of the corresponding amino compound with an acylating agent derived from the acid of the formula $R^2COOH$, wherein $R^2$ has the meaning stated above. A suitable acylating agent is, for example, an acyl halide or acid anhydride, or the acid itself in the presence of a condensing agent, for example a carbodiimide.

According to a further feature of the invention we provide a process for the manufacture of those of the alkanolamine derivatives of the invention wherein $R^4$ stands for an acyl radical which comprises the interaction of an acid-addition salt of the corresponding alkanolamine derivative wherein $R^4$ stands for hydrogen with an acylating agent derived from an acid of the formula $R^4OH$, wherein $R^4$ stands for an acyl radical.

As a suitable acylating agent there may be mentioned, for example, an acyl halide or acid anhydride, for example acetic anhydride, acetyl chloride or benzoyl chloride. The acylation may be carried out in a diluent or solvent, which, in the case where an acid anhydride is used as acylating agent, may conveniently be the acid from which the anhydride is derived.

As stated above, the alkanolamine derivatives of the present invention are of value in the treatment or prophylaxis of heart diseases. Furthermore, some of the alkanolamine derivatives of the invention possess selective β-adrenergic blocking activity. Compounds exhibiting this selective action show a greater degree of specificity in blocking the cardiac β-receptors than the β-receptors in peripheral blood vessels and bronchial muscle. Thus, a dose may be selected for such a compound at which the compound blocks the cardiac inotropic and chronotropic actions of a catecholamine [for example isoprenaline, that is, 1 - (3,4-dihydroxyphenyl) - 2 - isopropylaminoethanol] but does not block the relaxation of tracheal smooth muscle produced by isoprenaline or the peripheral vasodilator action of isoprenaline. Because of this selective action, one of these compounds may advantageously be used together with a sympathomimetic bronchodilator, for example isoprenaline, orciprenaline, adrenaline or ephedrine, in the treatment of asthma and other obstructive airways diseases, inasmuch as the selective compound will substantially inhibit the unwanted stimulatory effects of the bronchodilator on the heart but will not hinder the desirable therapeutic effect of the bronchodilator.

According to a further feature of the invention, therefore, we provide pharmaceutical compositions comprising as active ingredient one or more alkanolamine derivatives of the invention, or acid-addition salts thereof, in association with a pharmaceutically-acceptable diluent or carrier therefor.

As suitable compositions there may be mentioned, for example, tablets, capsules, aqueous or oily solutions or suspensions, emulsions, injectable aqueous or oily solutions or suspensions, dispersible powders and aerosol formulations.

The pharmaceutical compositions of the invention may contain, in addition to the alkanolamine derivatives of the invention, one or more additional drugs selected from sedatives, for example phenobarbitone, meprobamate and chlorpromazine; vasodilators, for example glyceryl trinitrate, pentaerythritol tetranitrate and isosorbide dinitrate; diuretics, for example chlorothiazide; hypotensive agents, for example reserpine, bethanidine and guanethidine; myocardial depressants, for example quinidine; and agents used in the treatment of Parkinsonism, for example benzhexol. Those of the pharmaceutical compositions of the invention which contain an alkanolamine derivative which possesses selective β-adrenergic blocking properties as stated above may additionally contain a sympathomimetic bronchodilator, for example isoprenaline, orciprenaline, adrenaline or ephedrine.

It is expected that the preferred compounds would be given to man at an oral dose of between 20 mg. and 400 mg. daily, at doses spaced at 4–6 hourly intervals, or at an intravenous dose of between 1 mg. and 20 mg. daily. Preferred oral dosage forms are tablets or capsules containing 10 mg. or 40 mg. of active ingredient. Preferred intravenous dosage forms are sterile aqueous solutions of non-toxic acid addition salts of the alkanolamine derivatives, containing between 0.05% and 1% w./v. of active ingredient, and more particularly containing 0.1% w./v. of active ingredient.

The invention is illustrated but not limited by the following examples in which the parts are by weight:

EXAMPLE 1

A mixture of 0.5 part of propionyl chloride in 25 parts of ether is added to a stirred solution of 1.55 parts of 1-(4 - aminophenoxy) - 3 - (N-benzyl-N-isopropylamino)-2-propanol in 50 parts of ether which is maintained at 15° C. The mixture is stirred for 2 hours and is then evaporated to dryness under reduced pressure. The residue is dissolved in 50 parts of ethanol, 0.4 part of a 5% palladium-on-charcoal catalyst is added, and the mixture is shaken with hydrogen at a pressure of 100 atmospheres and at ambient temperature until uptake of hydrogen ceases. The mixture is filtered and the filtrate is evaporated to dryness under reduced pressure. The residue is dissolved in 50 parts of aqueous 2 N-hydrochloric acid, treated with carbon and filtered. The filtrate is poured into 50 parts of aqueous 2 N-sodium hydroxide solution and the mixture is filtered. The solid residue is washed with water, dried and crystallised from ethyl acetate. There is thus obtained 3 - isopropylamino - 1 - (4-propionamidophenoxy)-2-propanol, M.P. 135–137° C.

EXAMPLE 2

A mixture of 1.5 parts of 1 - (5 - acetamido-2-n-butylphenoxy) - 2,3 - epoxypropane and 10 parts of isopropylamine is heated under reflux for 2 hours. The mixture is evaporated to dryness under reduced pressure, the residue is shaken with 25 parts of aqueous N-acetic acid and the mixture is extracted twice with 25 parts of ether each time. The aqueous phase is separated and added to 25 parts of aqueous 5 N-sodium hydroxide solution. The mixture is extracted three times with 25 parts of ether each time and the combined ethereal extracts are dried over anhydrous magnesium sulphate. The mixture is filtered and the filtrate is evaporated to dryness under reduced pressure. The residue is crystallised from a mixture of 15 parts of ethyl acetate and 0.5 part of water. There is thus obtained 1 - (5 - acetamido - 2-n-butylphenoxy)-3-isopropylamino - 2 - propanol hemihydrate, M.P. 131–132°C.

The 1 - (5 - acetamido - 2-n-butylphenoxy)-2,3-epoxypropane used as starting material may be obtained as follows:

A mixture of 1 part of 5 - acetamido - 2 - n-butylphenol, 0.2 part of sodium hydroxide, 0.7 part of epichlorohydrin, 2 parts of water and 20 parts of methanol is heated under reflux for 2 hours. The mixture is evaporated to dryness under reduced pressure. The residue consists of 1-(5-acetamido-2-n-butylphenoxy)-2,3-epoxypropane.

EXAMPLE 3

A solution of 0.4 part of acetyl chloride in 25 parts of ether is added to a stirred solution of 1.6 parts of 1-(4-amino - 3 - methylphenoxy) - 3-(N-benzyl-N-isopropylamino-2-propanol in 50 parts of ether which is maintained at 15° C. The mixture is stirred for 2 hours and the ethereal layer is then decanted off. The residue is dissolved in 50 parts of ethanol, 0.3 part of a 5% palladium-on-charcoal catalyst is added, and the mixture is shaken with hydrogen at atmospheric pressure and ambient temperature until the uptake of hydrogen ceases. The mixture is filtered and the filtrate is evaporated to dryness under reduced pressure. The residue is dissolved in 10 parts of water and the solution is treated with carbon and filtered. The filtrate is poured into 25 parts of aqueous N-sodium hydroxide solution and the mixture is stirred with 50 parts of ether. The mixture is filtered and the solid residue is washed with ether and crystallised from ethyl methyl ketone. There is thus obtained 1-(4-acetamido - 3 - methylphenoxy) - 3-isopropylamino-2-propanol, M.P. 165° C.

The 1 - (4 - amino - 3-methylphenoxy)-3-(N-benzyl-N-isopropylamino) - 2 - propanol used as starting material may be obtained as follows:

15.6 parts of epichlorohydrin are added to a solution of 4.5 parts of 3 - methyl - 4 - nitrophenol and 1.32 parts of sodium hydroxide in 50 parts of water which is maintained at 15° C. The mixture is stirred at ambient temperature for 16 hours and is then extracted with 50 parts of chloroform. The chloroform extract is dried over anhydrous magnesium sulphate, the mixture is filtered and the filtrate is evaporated to dryness under reduced pressure. The residue consists of 1 - (3 - methyl - 4-nitrophenoxy)-2,3-epoxypropane.

A mixture of 6 parts of the above compound and 4.5 parts of N - benzyl - N - isopropylamine is heated at 100° C. for 2 hours. The mixture is then extracted 4 times with petroleum ether (B.P. 80–100° C.) and the extracts are combined and evaporated to dryness under reduced pressure. There is thus obtained 1 - (3 - methyl - 4-nitrophenoxy)-3-(N-benzyl-N-isopropylamino)-2-propanol.

A solution of 5.6 parts of the above compound in 50 parts of ethanol is added dropwise to a rapidly stirred mixture of 16 parts of iron powder, 63 parts of ethanol and 0.26 part of concentrated hydrochloric acid which is heated under reflux. The mixture is stirred and heated under reflux for 1 hour, 0.26 part of concentrated hydrochloric acid is added, and the mixture is stirred and heated under reflux for a further 2 hours. 4 parts of aqueous 10 N-sodium hydroxide solution are then added and the hot mixture is filtered. The filtrate is evaporated to dryness under reduced pressure and the residue is stirred with 50 parts of aqueous N-hydrochloric acid and 50 parts of ether. The aqueous acidic phase is separated, treated with carbon, filtered and the filtrate is added to 50 parts of aqueous 2 N-sodium hydroxide solution. The mixture is extracted twice with 50 parts of ether each time and the ethereal extracts are combined and dried with anhydrous magnesium sulphate. The mixture is filtered and the filtrate is evaporated to dryness under reduced pressure. The residue consists of 1 - (4 - amino - 3-methylphenoxy)-3-(N-benzyl-N-isopropylamino)-2-propanol.

EXAMPLE 4

The process described in Example 1 is repeated except that 0.9 part of phenoxyacetyl chloride is used in place of the 0.5 part of propionyl chloride. The hydrogenation mixture is filtered and the filtrate is evaporated to dryness under reduced pressure. The residue is crystallised from isopropanol and there is thus obtained 3-isopropylamino - 1 - (4 - phenoxyacetamidophenoxy)-2-propanol hydrochloride, M.P. 168–170° C.

EXAMPLE 5

A mixture of 2 parts of 1 - (4 - acetamidophenoxy)-3-isopropylamino - 2 - propanol hydrochloride and 20 parts of acetyl chloride is heated under reflux for 3 hours. The mixture is cooled and filtered and the solid residue is washed with acetone. There is thus obtained 1-(4-acetamidophenoxymethyl) - 2 - isopropylaminoethyl acetate hydrochloride, M.P. 134–136° C. with decomposition.

EXAMPLE 6

A mixture of 0.35 part of acetyl chloride in 25 parts of ether is added to a stirred mixture of 0.75 part of 1-(2-aminophenoxy)-3-(N-benzyl-N-isopropylamino) - 2-propanol in 50 parts of ether maintained at 15° C. The mixture is stirred for 1 hour and evaporated to dryness under reduced pressure. The residue is dissolved in 50 parts of ethanol, 0.5 part of a 5% palladium-on-charcoal catalyst is added, and the mixture is shaken with hydrogen at ambient temperature and atmospheric pressure until the uptake of hydrogen ceases. The mixture is filtered and the filtrate is evaporated to dryness under reduced pressure. The residue is dissolved in 10 parts of water, and the solution is basified with aqueous 11 N-sodium hydroxide solution and extracted with 50 parts of ether. The ethereal extract is dried over anhydrous magnesium sulphate and filtered, and the filtrate is evaporated to dryness under reduced pressure. The residue is crystallised from ethyl methyl ketone and there is thus obtained 1-(2-acetamidophenoxy)-3-isopropylamino - 2 - propanol, M.P. 98–100° C.

EXAMPLE 7

A solution of 0.8 part of chloroacetyl chloride in 25 parts of ether is added to a stirred solution of 1.5 parts of 1-(4-aminophenoxy)-3-(N-benzyl - N - isopropylamino)-2-propanol in 50 parts of ether which is maintained at 15° C. The mixture is stirred for 2 hours and then evaporated to dryness under reduced pressure. The residue is dissolved in 50 parts of ethanol and 0.5 part of a 5% palladium-on-charcoal catalyst is added. The mixture is shaken with hydrogen at atmospheric pressure and ambient temperature until uptake of hydrogen ceases. The mixture is filtered and the filtrate is evaporated to dryness under reduced pressure. The residue is crystallised from isopropanol and there is thus obtained 1-(4-chloroacetamidophenoxy) - 3 - isopropylamino-2-propanol, M.P. 146–148° C.

EXAMPLE 8

A mixture of 3.4 parts of 1-(4-cyclohexanecarbonamidophenoxy) - 3-(N-benzyl-N-isopropylamino)-2-propanol, 100 parts of ethanol and 1.5 parts of a 5% palladium-on-charcoal catalyst is shaken with hydrogen at ambient temperature and atmospheric pressure for 1.6 hours when theoretical uptake of hydrogen is complete. The mixture is filtered and the filtrate is evaporated to dryness. The residue is crystallised three times from ethyl acetate and there is thus obtained 1-(4-cyclohexanecarbonamidophenoxy) - 3 - isopropylamino-2-propanol, M.P. 159–161° C.

The 1 - (4 - cyclohexanecarbonamidophenoxy) - 3 - (N-benzyl - N - isopropylamino)-2-propanol used as starting material may be obtained as follows:

A solution of 1.27 parts of cyclohexanecarboxylic acid and 3.14 parts of 1-(4-aminophenoxy) - 3 - (N-benzyl-N-isopropylamino)-2-propanol in 40 parts of ethyl acetate is stirred at 0° C. and a solution of 2.3 parts of N,N'-dicyclohexylcarbodi-imide in 10 parts of ethyl acetate is rapidly added. The mixture is stirred for 2 hours at ambient temperature and is then filtered. The filtrate is extracted three times with 80 parts of aqueous 2 N-hydrochloric acid each time, and the combined acidic extracts are basified with aqueous potassium hydroxide solution. The basic mixture is extracted with ethyl acetate and the extract is dried and evaporated to dryness. There is thus obtained as residue 1 - (4-cyclohexanecarbonamidophenoxy)-3-(N-benzyl-N-isopropylamino)-2-propanol.

EXAMPLE 9

The process described in the first part of Example 8 is repeated except that the appropriate starting material is used in place of 1-(4-cyclohexanecarbonamidophenoxy)-3-(N-benzyl-N-isopropylamino) - 2 - propanol. There are thus obtained the products described in the following table.

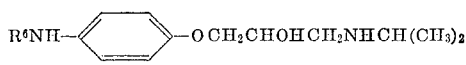

| R⁶ | M.P. (° C.) | Recrystallisation solvent |
| --- | --- | --- |
| Hydroxyacetyl | 125–128 | Ethyl acetate. |
| 2-furoyl | 138–141 | Benzene. |
| Cyclopropanecarbonyl | 159–160 | Ethyl acetate. |

The starting materials used in the above process may be obtained by the procedure described in the second part of Example 8 except that the appropriate carboxylic acid is used in place of cyclohexanecarboxylic acid.

EXAMPLE 10

A mixture of 4.75 parts of 1-[4-(p-acetamidobenzamido)phenoxy]-3-(N-benzyl-N-isopropylamino) - 2 - propanol hydrochloride, 0.27 part of a 5% palladium-on-charcoal catalyst and 50 parts of ethanol is shaken with hydrogen at atmospheric pressure and at ambient temperature until uptake of hydrogen ceases. The mixture is filtered and the filtrate is evaporated to dryness under reduced pressure. The residue is dissolved in 25 parts of water, and the solution is basified with aqueous 11 N-sodium hydroxide solution and stirred with 25 parts of ethyl acetate. The mixture is filtered and the solid residue is crystallised from methanol. There is thus obtained 1-[4-(p-acetamidobenzamido)phenoxy] - 3 - isopropylamino-2-propanol, M.P. 210–212° C.

The 1-[4-(p-acetamidobenzamido)phenoxy]-3-(N-benzyl-N-isopropylamino)-2-propanol hydrochloride used as starting material may be obtained as follows:

A solution of 3.7 parts of p-nitrobenzoyl chloride in 50 parts of ether and 30 parts of ethyl acetate is added to a stirred mixture of 6 parts of 1-(4-aminophenoxy)-3-(N-benzyl - N - isopropylamino)-2-propanol in 200 parts of ether which is maintained at 15° C. The mixture is stirred for 2 hours and filtered and the solid residue is crystallised from methanol. There is thus obtained 1-[4-(p-nitrobenzamido)phenoxy] - 3 - (N-benzyl-N-isopropylamino)-2-propanol hydrochloride, M.P. 230–232° C.

A solution of 5 parts of the above compound in 60 parts of ethanol and 10 parts of water is added dropwise to a stirred mixture of 375 parts of ethanol, 93.6 parts of iron powder and 1.56 parts of aqueous 11 N-hydrochloric acid which is heated under reflux. The mixture is stirred and heated under reflux for 3 hours, 12.6 parts of aqueous 11 N-sodium hydroxide solution are then added, and the hot mixture is filtered. The filtrate is evaporated to dryness under reduced pressure and the residue is extracted with 50 parts of ethyl acetate. The ethyl acetate phase is separated, dried with anhydrous magnesium sulphate, filtered and the filtrate is evaporated to dryness under reduced pressure. There is thus obtained 1-[4 - (p - aminobenzamido)phenoxy]-3-(N-benzyl-N-isopropylamino)-2-propanol.

A solution of 1 part of acetyl chloride in 25 parts of ether is added to a stirred solution of 4.32 parts of the above compound in 100 parts of benzene which is maintained at 15° C. The mixture is stirred for 2 hours and then filtered. The solid residue is washed with ether and there is thus obtained 1 - [4 - (p-acetamidobenzamido)-phenoxy] - 3 - (N - benzyl - N - isopropylamino) - 2- propanol hydrochloride.

EXAMPLE 11

A mixture of 2.8 parts of 1-(4 - m-nitrobenzamidophenoxy)-2,3-epoxypropane and 20 parts of isopropylamine is heated under reflux for 3 hours. The mixture is evaporated to dryness under reduced pressure and the residue is shaken with 50 parts of aqueous N-hydrochloric acid and 50 parts of ethyl acetate. The acidic phase is spearated and poured into 10 parts of aqueous 11 N-sodium hydroxide solution. The mixture is filtered and the solid residue is washed with water, dried and crystallised from isopropanol. There is thus obtained 3-isopropylamino - 1 - (4 - m - nitrobenzamidophenoxy)-2-propanol, M.P. 162–164° C.

The 1-(4 - m - nitrobenzamidophenoxy) - 2,3-epoxypropane used as starting material may be obtained as follows:

2.4 parts of epichlorohydrin are added to a solution of 2.5 parts of 4-m-nitrobenzamidophenol and 0.4 part of sodium hydroxide in 50 parts of water which is maintained at 15° C. The mixture is stirred at ambient temperature for 5 hours and is then extracted twice with 50 parts of chloroform each time. The chloroform extracts are combined, dried with anhydrous magnesium sulphate, and evaporated to dryness under reduced pressure. The residue consists of 1 - (4 - m - nitrobenzamidophenoxy)-2,3-epoxypropane.

EXAMPLE 12

A solution of 1.6 parts of p-toluoyl chloride in 25 parts of ether is added to a stirred solution of 1.5 parts of 1-(4-aminophenoxy) - 3 - (N - benzyl-N-isopropylamino) - 2 - propanol in 50 parts of ether which is maintained at 15° C. The mixture is stirred for 2 hours and is then evaporated to dryness under reduced pressure. The residue is dissolved in 50 parts of ethanol, 0.5 part of a 5% palladium-on-charcoal catalyst is added, and the mixture is shaken with hydrogen at atmospheric pressure and ambient temperature until uptake of hydrogen ceases. The mixture is filtered and the filtrate is evaporated to dryness under reduced pressure. The residue is shaken with 25 parts of water, 5 parts of aqueous 2 N-hydrochloric acid and 25 parts of ethyl acetate. The mixture is filtered, and the acidic phase is separated and added to 25 parts of aqueous 2 N-sodium hydroxide solution. The mixture is filtered and the solid residue is washed with water, dried and crystallised from isopropanol. There is thus obtained 3-isopropylamino - 1 - (4-p-toluamidophenoxy)-2-propanol, M.P. 176° C.

EXAMPLE 13

0.4 part of a 5% palladium-on-charcoal catalyst is added to a solution of 1.1 parts of 1-(4 - formamidophenoxy) - 3 - N - benzyl - N-isopropylamino-2-propanol in 30 parts of ethanol, and the mixture is shaken with hydrogen at atmospheric pressure and ambient temperature until uptake of hydrogen is complete. The mixture is filtered and the filtrate is evaporated to dryness. The residue is crystallised from ethanol and there is thus obtained 1-(4-formamidophenoxy) - 3 - isopropylamino-2-propanol dihydrate, M.P. 189–192° C.

The 1 - (4 - formamidophenoxy) - 3 - N-benzyl-N-isopropylamino-2-propanol used as starting material in the above process may be prepared as follows:

21.6 parts of acetic anhydride are added dropwise during 1 hour to a stirred solution of 4 parts of 1-(4-aminophenoxy)-3-N-benzyl-N-isopropylamino - 2 - propanol in 57.3 parts of 98% formic acid which is maintained at 5–10° C. The mixture is stirred for 6 hours at ambient temperature, 20 parts of ice-water are added, and aqueous sodium hydroxide solution is then added until the mixture is alkaline. The mixture is extracted twice with 300 parts of chloroform each time and the combined extracts are dried and evaporated to dryness. There is thus obtained 1-(4-formamidophenoxy) - 3 - N - benzyl - N-isopropylamino-2-propanol.

EXAMPLE 14

A solution of 2.57 parts of N,N' - dicyclohexylcarbodiimide in 20 parts of ethyl acetate is added dropwise during 2 minutes to a stirred mixture of 3.15 parts of acrylic acid, 2.0 parts of 1 - (4 - aminophenoxy) - 3-isopropylaminopropan - 2 - ol and 30 parts of ethyl acetate which is maintained between 0 and 5° C. The mixture is stirred at 0–5° C. for a further 30 minutes, 65 parts of aqueous 2 N-hydrochloric acid are added and the mixture is vigorously shaken and then filtered through a filteraid. The aqueous phase is separated, basified with concentrated aqueous sodium hydroxide solution with cooling and stirring, and then extracted twice with 50 parts of ethyl acetate each time. The extracts are washed with 20 parts of water, dried, and evaporated to dryness at ambient temperature. The residue is crystallised from ethyl acetate and there is thus obtained 1-(4-acrylamidophenoxy) - 3 - isopropylaminopropan-2-ol, M.P. 127–132° C. containing one quarter of a molecule of water of crystallisation.

EXAMPLE 15

A mixture of 2.07 parts of 1-(4-acetamidophenoxy)-2,3-epoxypropane, 10 parts of ethanol and 1.5 parts of cyclopropylamine is heated in a sealed vessel at 100° C. for 10 hours. The mixture is evaporated to dryness under reduced pressure and the residue is crystallised from 10 parts of ethyl acetate. There is thus obtained 1 - (4-acetamidophenoxy) - 3 - cyclopropylamino-2-propanol, M.P. 114–116° C.

EXAMPLE 16

A mixture of 1 part of 1-(4-acetamidophenoxy)-2,3-epoxypropane, 25 parts of ethanol and 25 parts of a 33% solution of methylamine in ethanol is heated under reflux for 4 hours. The mixture is evaporated to dryness under reduced pressure and the residue is crystallised from a mixture of 6 parts of ethyl acetate and 1 part of ethanol. There is thus obtained 1-(4-acetamidophenoxy)-3-methylamino-2-propanol, M.P. 122° C.

EXAMPLE 17

A mixture of 4.2 parts of 1-(3-acetamido-5-methylphenoxy)-3-chloro-2-propanol, 14 parts of isopropylamine and 20 parts of methanol is heated in a sealed tube at 110° C. for 12 hours. The mixture is evaporated to dryness and the residue is shaken with a mixture of ethyl acetate and water. The organic layer is separated, dried and evaporated to dryness and the residue is purified by preparative thin-layer chromatography on silica gel plates using a 3% w./v. solution of triethylamine in ethanol as developing solvent. The purified product is crystallised from ethyl acetate and there is thus obtained 1-(3-acetamido - 5 - methylphenoxy)-3-isopropylamino-2-propanol, M.P. 134.5–137° C.

The 1 - (3 - acetamide-5-methylphenoxy)-3-chloro-2-propanol used as starting material may be obtained as follows:

A solution of 1.73 parts of 3-acetamide-5-nitrotoluene in 60 parts of ethanol is shaken with 0.85 part of a 5% palladium-on-charcoal catalyst in an atmosphere of hydrogen at atmospheric pressure for 1 hour. The mixture is filtered and the filtrate is evaporated to dryness. There is thus obtained 3-acetamide-5-aminotoluene as an oil.

A solution of 0.68 part of sodium nitrite in 10 parts of water is added dropwise to a stirred solution of 1.45 parts of 3-acetamido-5-aminotoluene in 45 parts of water containing 3.3 parts of sulphuric acid which is maintained between 5 and 10° C. The resulting suspension is added during 10 minutes to 50 parts of boiling water, and the mixture is cooled and extracted three times with 100 parts of ethyl acetate each time. The extract is dried and evaporated to dryness and the residue is purified by preparative thin-layer chromatography on silica gel plates using a mixture of 3 parts of triethylamine, 20 parts of ethanol and 100 parts of ethyl acetate as developing solvent. The major band is eluted with methanol, the methanol solution is evaporated to dryness and the residue is dissolved in ethyl acetate. The solution is extracted with 10% aqueous potassium hydroxide solution and the extract is acidified and then extracted with ethyl acetate. The extract is dried and evaporated to dryness and there is thus obtained as residue 3-acetamido-5-methylphenol.

A mixture of 2 parts of 3-acetamido-5-methylphenol 15 parts of epichlorhydrin, 0.05 part of piperidine and 10 parts of isopropanol is heated at 95–100° C. for 6 hours. The mixture is evaporated to dryness under reduced pressure and the residue consists of 1-(3-acetamido-5-methylphenoxy-3-isopropylamino-2-propanol.

EXAMPLE 18

A solution of 6 parts of 1-chloro-3-(4-propionamidophenoxy)-propan-2-ol and 11.5 parts of t-butylamine in 15 parts of methanol is heated in a sealed tube for 12 hours at 110° C. The solution is evaporated to dryness, the residue is dissolved in 80 parts of ethyl acetate and the mixture is extracted twice with 50 parts of aqueous 2 N-hydrochloric acid each time. The acidic layer is washed with 30 parts of ethyl acetate and basified and the mixture is extracted successively with 100 parts and 50 parts of ethyl acetate. The combined organic extracts are washed with 20 parts of water, dried and evaporated to dryness. The residue is crystallised from a mixture of ethyl acetate and hexane, and there is thus obtained 1-(4-propionamidophenoxy)-3-t-butylaminopropan-2-ol, M.P. 99–101.5° C. The 1-chloro-3-(4-propionamidophenoxy)-propan-2-ol used as starting material may be obtained as follows:

A mixture of 3.95 parts of 4-propionamidophenol, 30 parts of of epichlorhydrin and 0.05 part of piperidine is heated for six hours at 95–100° C. The excess of epichlorhydrin is removed by evaporation under reduced pressure and there is thus obtained 1-chloro-3-(4-propionamidophenoxy)propan-2-ol as an oil.

What we claim is:
1. An alkanolamine derivative selected from compounds of the formula:

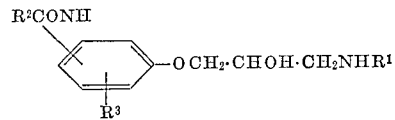

wherein $R^1$ is selected from alkyl, hydroxyalkyl and phenylalkyl wherein the alkyl in each instance contains 3–5 carbon atoms and is branched at the alpha-carbon atom, cycloalkyl of 3 to 6 carbon atoms and allyl; $R^2$ is selected from methyl substituted with hydroxy, phenoxy, chlorine, bromine or fluorine, cycloalkyl of 3 to 6 carbon atoms, furyl, thienyl or pyridyl; and $R^3$ is hydrogen; and the non-toxic, pharmaceutically-acceptable acid-addition salts thereof.

2. A compound as claimed in claim 1 selected from 1 - (4 - hydroxyacetamidophenoxy)-3-isopropylamino-2-propanol; 1 - (4 - phenoxyacetamidophenoxy)-3-isopropylamino - 2 - propanol; 1-(4-chloroacetamidophenoxy)-3 - isopropylamino - 2 - propanol; 1-(4-cyclopropanecarbonamidophenoxy) - 3 - isopropylamino-2-propanol; 1 - (4 - cyclohexanecarbonamidophenoxy)-3-isopropylamino - 2 - propanol and 1-[4-(2-furamido)phenoxy]-3-isopropylamino-2-propanol and the non-toxic, pharamceutically-acceptable acid-addition salts thereof.

3. An acid-addition salt, as claimed in claim 1, which is selected from the group consisting of a hydrochloride, hydrobromide, phosphate, sulphate, oxalate, lactate, tartrate, acetate, salicylate, citrate, benzoate, β-naphthoate, adipate and 1,1-methylene-bis-(2-hydroxy-3-naphthoate) of an alkanolamine derivative claimed in claim 1.

4. An alkanolamine derivative selected from compounds of the formula given in claim 1 wherein $R^1$ is selected from isopropyl, s-butyl, t-butyl, 2-hydroxy-1,1-dimethylethyl, cyclopropyl, cyclobutyl and cyclopentyl, wherein $R^2$ is selected from hydroxymethyl, phenoxymethyl, chloromethyl, trifluoromethyl, cyclopropyl, cyclobutyl, cyclopentyl, cyclohexyl, furyl, thienyl and pyridyl, and wherein $R^3$ is selected from hydrogen, methyl and ethyl, and the non-toxic, pharmaceutically-acceptable acid-addition salts thereof.

5. An alkanolamine derivative selected from compounds of the formula given in claim 1 wherein $R^1$ is isopropyl, $R^2$ is selected from hydroxymethyl, phenoxymethyl, chloromethyl, cyclopropyl, cyclohexyl and furyl, and $R^3$ is hydrogen, and the non-toxic, pharmaceutically-acceptable acid-addition salts thereof.

References Cited

UNITED STATES PATENTS 3,408,387  10/1968  Howe et al. _____ 260—562

FOREIGN PATENTS 6512676  3/1966  Netherlands _____ 260—562

HENRY R. JILES, Primary Examiner

H. J. MOATZ, Assistant Examiner

U.S. Cl. X.R.

260—295, 332.2, 348, 471, 477, 490, 501.17, 556, 557, 558, 559, 562, 347; 424—266, 275, 285, 300, 308, 311, 312, 324